US012658642B2

(12) United States Patent
Ohashi

(10) Patent No.: US 12,658,642 B2
(45) Date of Patent: Jun. 16, 2026

(54) LEVER-TYPE CONNECTOR

(71) Applicant: SUMITOMO WIRING SYSTEMS, LTD., Mie (JP)

(72) Inventor: Yuki Ohashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 280 days.

(21) Appl. No.: 18/282,971

(22) PCT Filed: Mar. 29, 2022

(86) PCT No.: PCT/JP2022/015620

§ 371 (c)(1),
(2) Date: Sep. 19, 2023

(87) PCT Pub. No.: WO2022/210755

PCT Pub. Date: Oct. 6, 2022

(65) Prior Publication Data

US 2024/0170891 A1 May 23, 2024

(30) Foreign Application Priority Data

Mar. 30, 2021 (JP) ................................ 2021-058674

(51) Int. Cl.
*H01R 13/629* (2006.01)
*H01R 13/52* (2006.01)
(Continued)

(52) U.S. Cl.
CPC ... *H01R 13/62955* (2013.01); *H01R 13/5202* (2013.01); *H01R 13/5219* (2013.01);
(Continued)

(58) Field of Classification Search
CPC .......... H01R 13/62955; H01R 13/5202; H01R 13/5219; H01R 13/62938; H01R 13/6295;
(Continued)

(56) References Cited

U.S. PATENT DOCUMENTS

2007/0026706 A1* 2/2007 Matsubara ....... H01R 13/62955 439/157
2015/0072542 A1* 3/2015 Hara .................... H01R 13/516 439/74

FOREIGN PATENT DOCUMENTS

JP 2004-319124 A 11/2004
JP 2009-289648 A 12/2009
(Continued)

OTHER PUBLICATIONS

International Search Report issued on Jun. 7, 2022 for WO 2022/210755 A1 (4 pages).

*Primary Examiner* — Justin M Kratt
(74) *Attorney, Agent, or Firm* — Venjuris, P.C.

(57) ABSTRACT

A lever-type connector according to one aspect of the present disclosure is provided with a housing including an opening and a lever. The housing includes a pair of side walls and a pair of coupling walls. The lever includes a pair of arm portions and an operating portion. The lever attaches and detaches the housing to and from a mating connector as being rotated between a first position where the lever is upright with respect to an axis of the housing and a second position where the lever is inclined away from the opening. The housing and the lever include first restricting portions for restricting rotation of the lever from the first position toward the opening by interfering with each other. The first restricting portions include the coupling wall facing the operating portion with the lever located at the first position.

9 Claims, 11 Drawing Sheets

(51) Int. Cl.
*H01R 13/658* (2011.01)
*H01R 13/6581* (2011.01)
*H01R 13/6585* (2011.01)
*H01R 13/6586* (2011.01)

(52) U.S. Cl.
CPC ... *H01R 13/62938* (2013.01); *H01R 13/6295* (2013.01); *H01R 13/658* (2013.01); *H01R 13/52* (2013.01); *H01R 13/629* (2013.01); *H01R 13/62933* (2013.01); *H01R 13/6581* (2013.01); *H01R 13/6585* (2013.01); *H01R 13/6586* (2013.01)

(58) Field of Classification Search
CPC .... H01R 13/658; H01R 13/52; H01R 13/629; H01R 13/62933; H01R 13/6581; H01R 13/6585; H01R 13/6586
See application file for complete search history.

(56) References Cited

FOREIGN PATENT DOCUMENTS

| | | |
|---|---|---|
| JP | 2014-150172 A | 8/2014 |
| JP | 2019-067500 A | 4/2019 |

* cited by examiner

LEVER-TYPE CONNECTOR

CROSS REFERENCE TO RELATED APPLICATIONS

This application is a national phase of PCT application No. PCT/JP2022/015620, filed on 29 Mar. 2022, which claims priority from Japanese patent application No. 2021-058674, filed on 30 Mar. 2021, all of which are incorporated herein by reference.

TECHNICAL FIELD

The present invention relates to a lever-type connector.

BACKGROUND

Patent Document 1 discloses a reactor constituting an in-vehicle converter. A wiring harness extending from an external device such as a power supply is connected to this reactor. The wiring harness is provided with a cable and a plug connected to the cable. The plug is provided with a housing and a lever rotatably supported on the housing. The lever includes a cam groove.

The reactor is provided with a receptacle attachable to and detachable from the plug. The receptacle is provided with a housing to be connected to the housing of the plug. The housing of the receptacle includes a cam pin to be guided by the cam groove.

By guiding the cam pin along the cam groove, the housing of the plug is connected to the housing of the receptacle.

PRIOR ART DOCUMENT

Patent Document

Patent Document 1: JP 2014-150172 A

SUMMARY OF THE INVENTION

Problems to be Solved

In the lever-type plug of the wiring harness to be connected to such a reactor, the lever may rotate against a worker's intention, thereby interrupting the worker's operation, when the worker attaches or detaches the plug to or from the receptacle.

Note that such a problem is not limited to the lever-type plug to be connected to the receptacle of the reactor and similarly occurs in lever-type connectors used in electrically connecting devices.

The present disclosure aims to provide a lever-type connector enabling easy attachment and detachment of a connector and a mating connector.

Means to Solve the Problem

The present invention is directed to a lever-type connector with a tubular housing including an opening, a part of a mating connector being inserted into the opening, and a lever to be rotatably supported on the housing, the housing including a pair of side walls facing each other and a pair of coupling walls coupling the side walls and facing each other, the pair of side walls and the pair of coupling walls constituting the opening, the lever including a pair of arm portions configured to respectively cover the pair of side walls from outside and to be supported rotatably with respect to the side walls and an operating portion coupling the arm portions, the lever attaching and detaching the housing to and from the mating connector as being rotated between a first position where the lever is upright with respect to an axis of the housing and a second position where the lever is inclined away from the opening, the housing and the lever including restricting portions for restricting rotation of the lever from the first position toward the opening by interfering with each other, and the restricting portions including the coupling wall facing the operating portion with the lever located at the first position.

Effect of the Invention

According to the present disclosure, a connector and a mating connector can be easily attached and detached.

DETAILED DESCRIPTION TO EXECUTE THE INVENTION

Description of Embodiments of Present Disclosure

Figure 1:
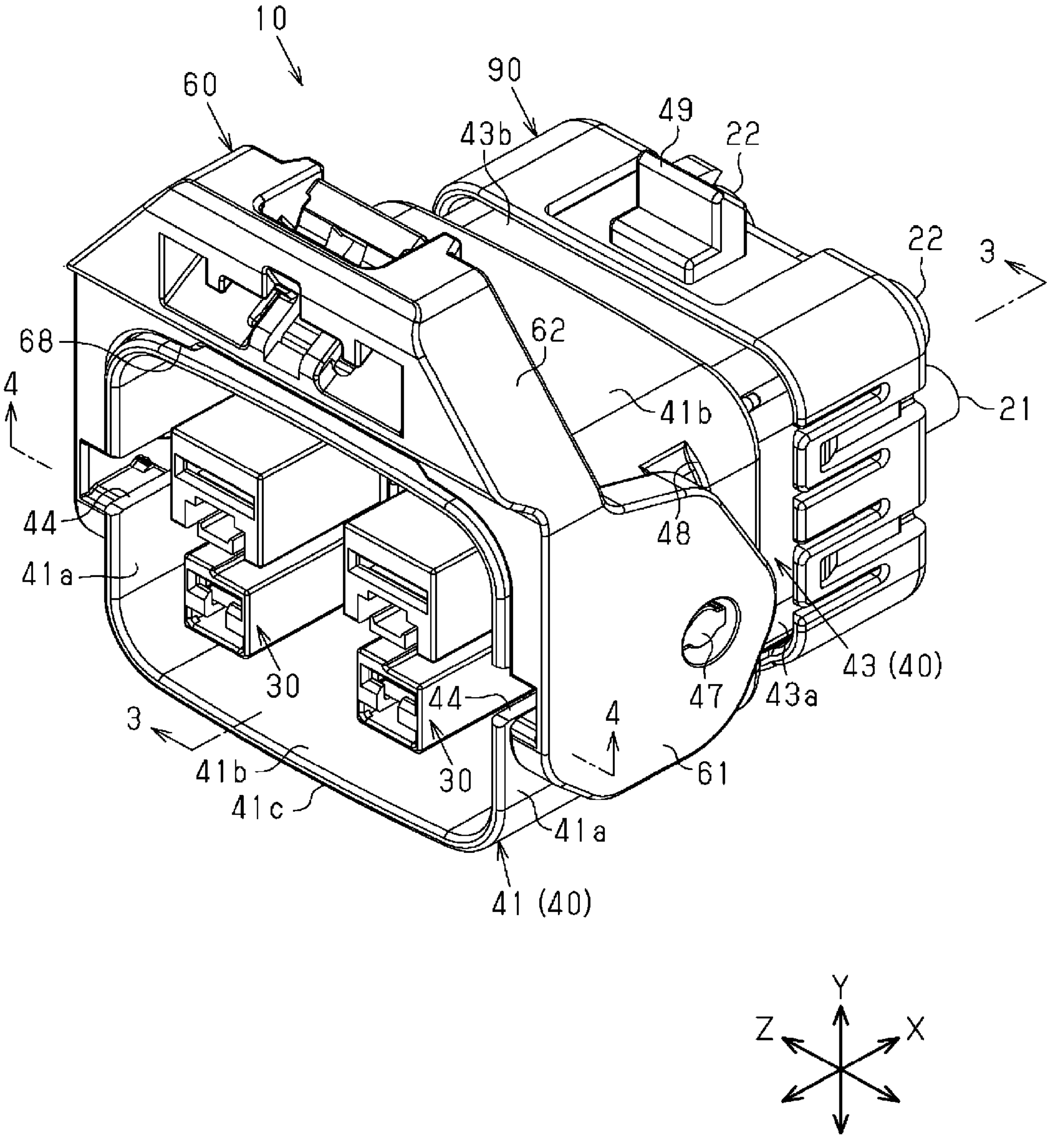
FIG. 1 is a perspective view showing one embodiment of a lever-type connector.

First, embodiments of the present disclosure are listed and described.

[1] The lever-type connector of the present disclosure is provided with a tubular housing including an opening, a part of a mating connector being inserted into the opening, and a lever to be rotatably supported on the housing, the housing including a pair of side walls facing each other and a pair of coupling walls coupling the side walls and facing each other, the pair of side walls and the pair of coupling walls constituting the opening, the lever including a pair of arm portions configured to respectively cover the pair of side walls from outside and to be supported rotatably with respect to the side walls and an operating portion coupling the arm portions, the lever attaching and detaching the housing to and from the mating connector as being rotated between a first position where the lever is upright with respect to an axis of the housing and a second position where the lever is inclined away from the opening, the housing and the lever including restricting portions for restricting rotation of the lever from the first position toward the opening by interfering with each other, and the restricting portions including the coupling wall facing the operating portion with the lever located at the first position.

According to this configuration, the connector is attached to the mating connector by rotating the lever from the first position to the second position. Further, the connector is detached from the mating connector by rotating the lever from the second position to the first position.

Further, according to the above configuration, the rotation of the lever from the first position toward the opening is restricted by the mutual interference of the coupling wall facing the operating portion and the lever. In this way, it is suppressed that the lever rotates from the first position toward the opening against a worker's intention to interrupt the worker's operation in attaching or detaching the connector and the mating connector. Therefore, the connector and the mating connector can be easily attached and detached.

[2] Preferably, the restricting portions include a protrusion projecting from at least one of the operating portion and the arm portions.

According to this configuration, the rotation of the lever from the first position toward the opening is restricted by the mutual interference of the protrusion projecting from at least one of the operating portion and the arm portions and the coupling wall facing the operating portion.

Further, according to the above configuration, the configuration of the coupling wall facing the operating portion can be simplified by providing the protrusion serving as the restricting portion on the lever.

[3] Preferably, the lever-type connector is provided with a plurality of terminals provided inside the housing, and the plurality of terminals are arranged in a facing direction of the coupling walls.

To set the restricting portions on the housing and the lever, the size of a gap between the coupling wall facing the operating portion and the lever needs to be increased as compared to conventional lever-type connectors.

Further, in providing the plurality of terminals inside the housing, at least one of an interval between the side walls and an interval between the coupling walls needs to be increased.

According to the above configuration, the interval between the coupling walls increases as the plurality of terminals are provided in parallel in the facing direction of the coupling walls. Here, it can be suppressed the build of the lever-type connector increases in the facing direction of the coupling walls by utilizing a part of an increase in the interval between the coupling walls to reduce the gap between the coupling wall facing the operating portion and the operating portion.

[4] Preferably, the housing includes a pair of support shafts projecting toward mutually opposite sides from outer surfaces of the pair of side walls, the arm portions include support holes, the support shafts being inserted into the support holes, and the support shafts and the support holes have convex and concave parts to allow passage of the support shafts into the support holes with the lever located at the first position and, on the other hand, hinder the passage of the support shafts into the support holes with the lever located at a position other than the first position between the first and second positions.

According to this configuration, the lever is mounted on the housing while being located at the first position. Thus, the worker can quickly rotate the lever toward the second position from a state where the lever is mounted on the housing. Therefore, an operation from the assembling of the lever-type connector to the attachment of the lever-type connector to the mating connector can be performed without waste.

Further, according to the above configuration, the passage of the support shafts into the support holes is hindered by the mutual interference of the convex and concave parts provided on the support shafts and in the support holes with the lever located at the position other than the first position between the first and second positions. Therefore, the detachment of the lever can be suppressed in attaching or detaching the lever-type connector to or from the mating connector.

[5] Preferably, the arm portion includes a guiding groove in an inner surface thereof, the guiding groove being engaged with a guiding shaft portion projecting from a housing of the mating connector and guiding a relative movement of the guiding shaft portion when the lever rotates between the first and second positions, and the side wall includes a cut portion for allowing the guiding shaft portion to escape.

According to this configuration, if the lever is rotated from the first position to the second position, the guiding groove provided in the inner surface of the arm portion is engaged with the guiding shaft portion and guides a relative movement of the guiding shaft portion. In this way, the connector is attached to the mating connector.

If the side wall is not provided with the cut portion, the guiding shaft portion interferes with the side wall in attaching the mating connector to the connector, wherefore the guiding shaft portion cannot be inserted into the guiding groove. Accordingly, it is considered to provide the guiding groove in the outer surface of the arm portion of the lever and provide the guiding shaft portion on the mating connector to be engaged with the guiding groove. However, in this case, the build of the mating connector increases in the facing direction of the side walls. In that respect, according to the above configuration, the guiding groove can be provided in the inner surface of the arm portion of the lever by providing the cut portion in the side wall. Therefore, an increase in the build of the mating connector in the facing direction of the side walls can be suppressed and, consequently, an increase in the build of an entire connector device in the facing direction of the side walls can be suppressed.

[6] Preferably, when the restricting portions are first restricting portions, the housing and the lever include second restricting portions for restricting rotation of the lever from the first position toward the second position by being engaged with each other, and the second restricting portions are constituted by the cut portion and an engaging protrusion provided on the inner surface of the arm portion and to be engaged with the cut portion with the lever located at the first position.

According to this configuration, since the rotation of the lever in both directions is restricted by both the first restricting portions and the second restricting portions with the lever located at the first position, the posture of the lever is held. In this way, it is further suppressed that the lever interrupts the worker's operation due to the rotation of the lever against the worker's intention when the worker attaches or detaches the connector and the lever-type connector. Therefore, the lever-type connector and the mating connector can be more easily attached and detached.

[7] Preferably, the side wall includes an escaping recess for allowing the engaging protrusion to escape with the lever located at the second position.

According to this configuration, the engaging protrusion is allowed to escape by the escaping recess when the lever is rotated from the first position to the second position. Therefore, the mutual interference of the lever and the side wall of the housing can be suppressed at the second position.

[8] Preferably, the lever-type connector is provided with a plurality of terminals provided inside the housing and a shield member in the form of a metal tube provided inside the housing, the shield member covering outer peripheries of the plurality of terminals, a gap for allowing insertion of a housing of the mating connector is provided between the housing and the shield member, and the shield member and the cut portion overlap in a facing direction of the side walls.

According to this configuration, the plurality of terminals can be electromagnetically shielded by the shield member provided inside the housing.

Further, according to the above configuration, an end part of the shield member in an axial direction of the housing can be located close to the opening. Therefore, shielding performance by the shield member can be enhanced as compared to the case where the shield member and the cut portion do not overlap in the facing direction of the side walls.

[9] Preferably, the lever-type connector is provided with a sealing member provided inside the housing, the sealing member sealing between the housing and a housing of the mating connector.

According to this configuration, the intrusion of external matters such as mud and water through a gap between the housing of the connector and the housing of the mating connector is suppressed by the sealing member. Therefore, the intrusion of external matters into the housings can be suppressed.

Details of Embodiment of Present Disclosure

A specific example of a lever-type connector of the present disclosure is described below with reference to the drawings. In each figure, some of components may be shown in an exaggerated or simplified manner for the convenience of description. Further, a dimension ratio of each part may be different in each figure. Note that the present disclosure is not limited to these illustrations, but is represented by claims and intended to include all changes in the scope of claims and in the meaning and scope of equivalents. "Orthogonal" in this specification means not only strictly orthogonal, but also substantially orthogonal within a range in which functions and effects in an embodiment are achieved.

<Overall Configuration of Lever-Type Connector 10>

Figure 2:
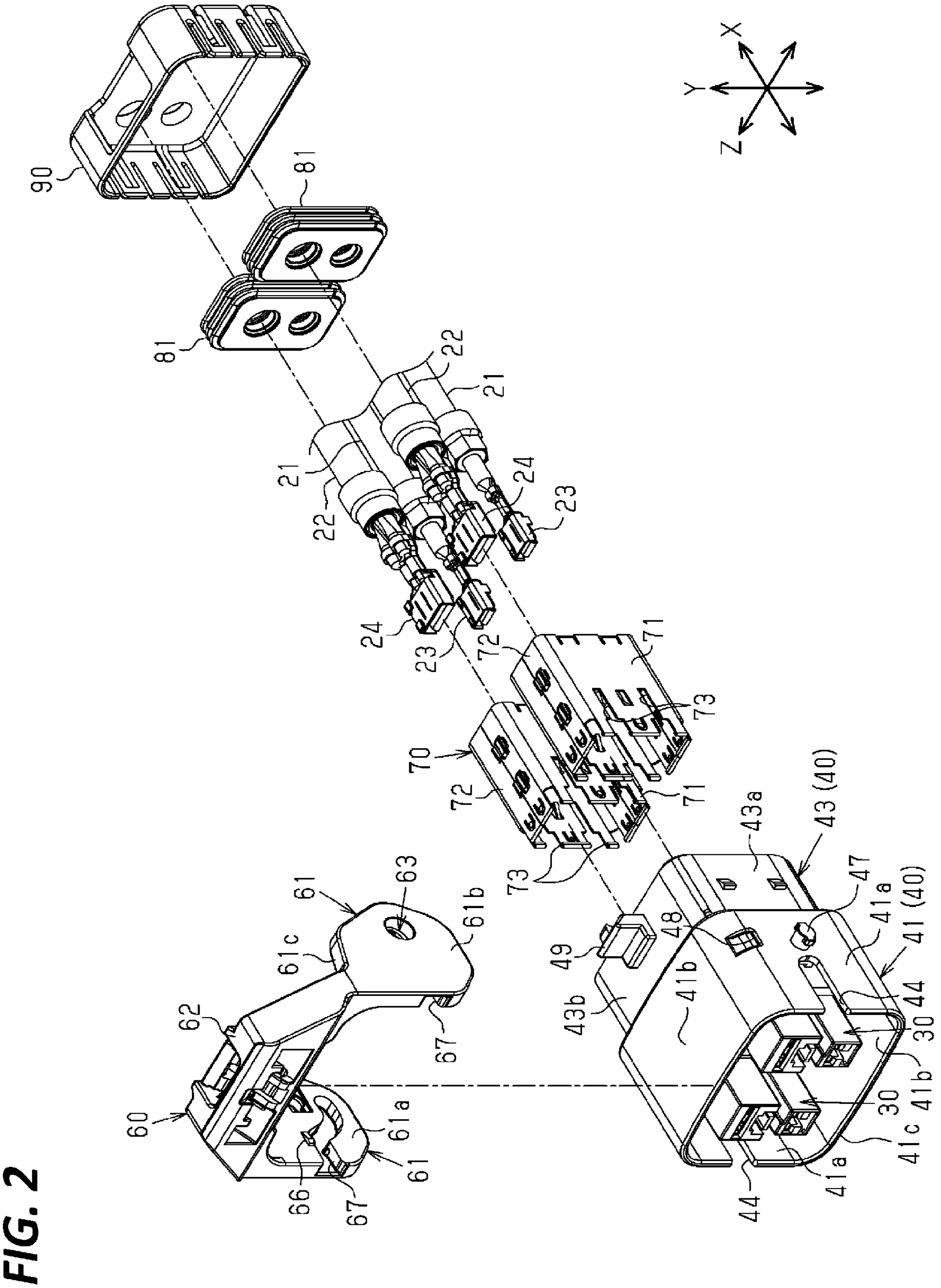
FIG. 2 is an exploded perspective view showing the lever-type connector of FIG. 1 in a disassembled state.

As shown in FIGS. 1 and 2, a lever-type connector 10 (hereinafter, connector 10) is provided with first wires 21, second wires 22, terminal holding portions 30, a tubular housing 40 and a lever 60.

Further, the connector 10 is provided with shield members 70 in the form of metal tubes, first sealing members 81 and a retainer 90.

Note that, in the following description, an axial direction of the housing 40 is referred to as a first direction X, a direction orthogonal to the first direction X is referred to as a second direction Y and a direction orthogonal to both the first and second directions X, Y is referred to as a third direction Z.

Two first wires 21 and two second wires 22 are provided in this embodiment. An outer diameter of the first wire 21 is smaller than that of the second wire 22.

The first and second wires 21, 22 are both pulled out from the connector 10 in the first direction X. The first and second wires 21, 22 are arranged in the second direction Y. In particular, the second wires 22 and the first wires 21 are arranged in this order from an upper side in a vertical direction of FIG. 2. Further, the first wires 21 are arranged in the third direction Z and the second wires 22 are arranged in the third direction Z.

Figure 3:
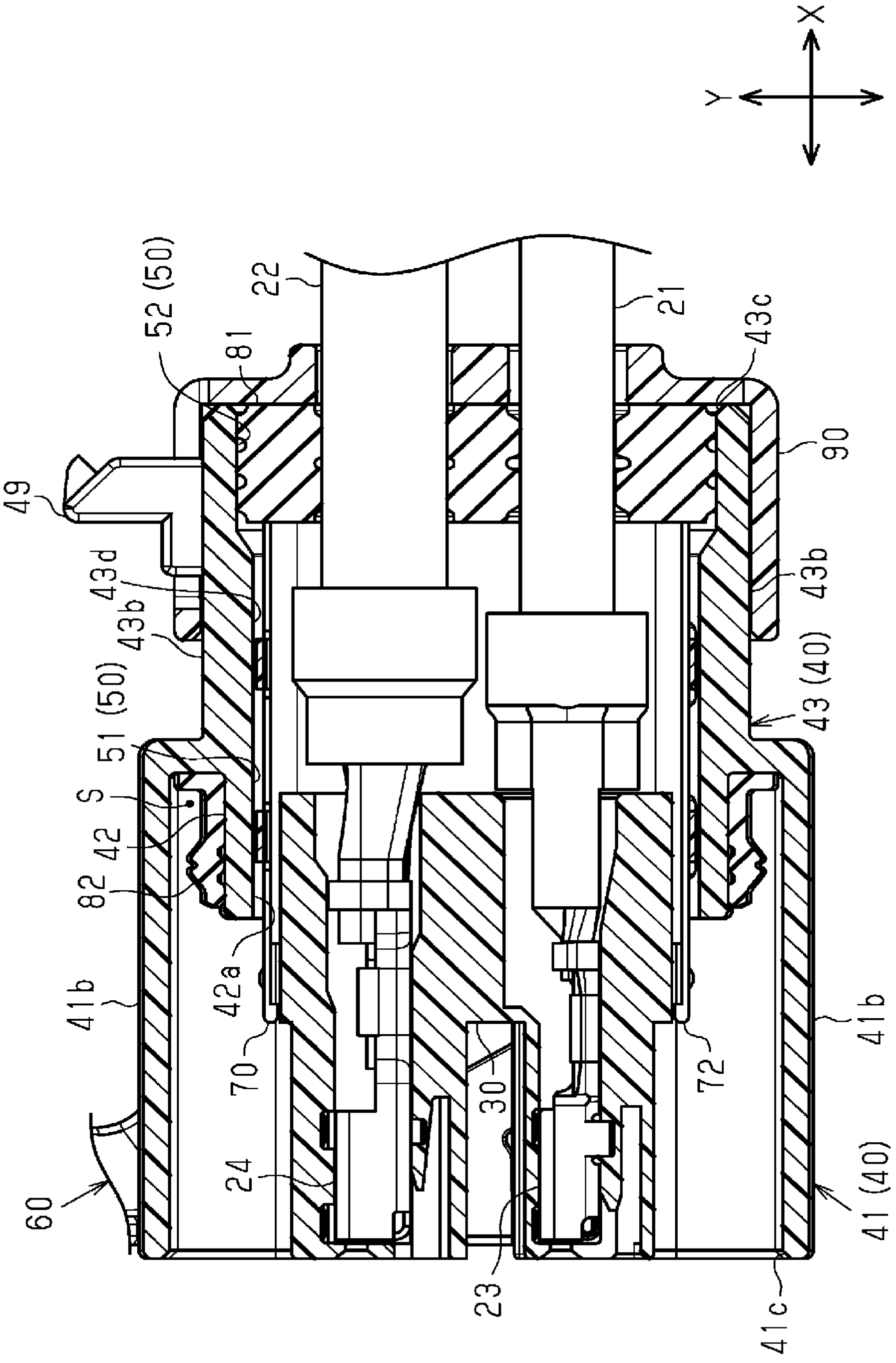
FIG. 3 is a section along 3-3 of FIG. 1.

As shown in FIGS. 2 and 3, a first terminal 23 is connected to one end part of each of the two first wires 21. A second terminal 24 is connected to one end part of each of the two second wires 22. The first and second terminals 23, 24 are both held in the terminal holding portion 30.

The terminal holding portion 30 collectively holds one first terminal 23 and one second terminal 24 arranged in the second direction Y. In this embodiment, two terminal holding portions 30 are provided.

Terminals and a connector (both not shown) are mounted on the other end parts (not shown) of the first and second wires 21, 22. The first and second wires 21, 22 electrically connect, for example, devices (both not shown) such as an inverter and a motor device mounted in a vehicle.

<Housing 40>

As shown in FIGS. 1 to 3, the housing 40 accommodates two first wires 21 and two second wires 22.

The housing 40 is provided with a receptacle 41 and an end part 43.

The receptacle 41 accommodates the two terminal holding portions 30. The receptacle 41 has a flat shape long in the third direction Z. The receptacle 41 includes a pair of side walls 41*a* and a pair of coupling walls 41*b* coupling the side walls 41*a*. The side walls 41*a* are facing each other in the third direction Z. The coupling walls 41*b* are facing each other in the second direction Y. The receptacle 41 includes an opening 41*c*, into which a housing 140 (see FIGS. 12A and 12B) of a mating connector 110 is inserted. The opening 41*c* is configured by end edges of the pair of side walls 41*a* and the pair of coupling walls 41*b*.

The side wall 41*a* includes a cut portion 44. The cut portion 44 extends along the first direction X from the end edge of the side wall 41*a* on the side of the opening 41*c*. In particular, the cut portion 44 linearly extends from the end edge to a center of the receptacle 41 in the first direction X. The cut portion 44 is located in a center of the receptacle 41 in the second direction Y.

Figure 4:
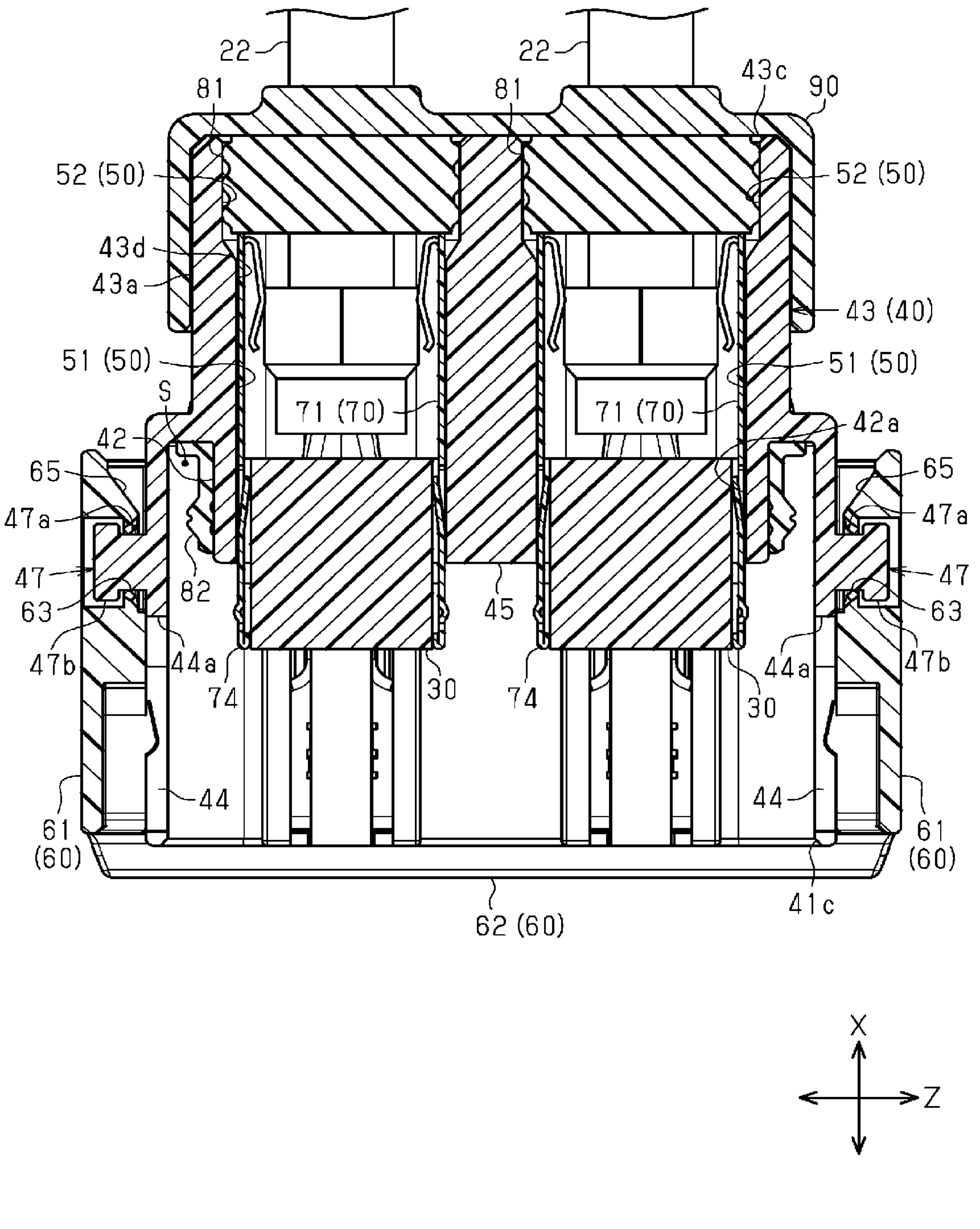
FIG. 4 is a section along 4-4 of FIG. 1.

As shown in FIGS. 3 and 4, the housing 40 is provided with an inner tube portion 42. The inner tube portion 42 is located between the receptacle 41 and the terminal holding portions 30. The inner tube portion 42 extends from a coupled part of the receptacle 41 and the end part 43 toward the opening 41*c*. An inner peripheral surface 42*a* of the inner tube portion 42 is connected to an inner peripheral surface 43*d* of the end part 43 entirely in a circumferential direction.

A gap S for allowing the insertion of the housing 140 (see FIGS. 12A and 12B) of the mating connector 110 is provided between the inner tube portion 42 and the receptacle 41.

As shown in FIGS. 2 to 4, the end part 43 is coupled to the receptacle 41 on a side opposite to the opening 41*c*. The end part 43 includes a pair of side walls 43*a* and a pair of coupling walls 43*b* coupling the side walls 43*a*. The side walls 43*a* are facing each other in the third direction Z. The coupling walls 43*b* are facing each other in the second direction Y. The end part 43 includes an insertion opening 43*c*, into which the first and second wires 21, 22 are inserted.

The insertion opening 43*c* is configured by end edges of the pair of side walls 43*a* and the pair of coupling walls 43*b*.

Figure 5:
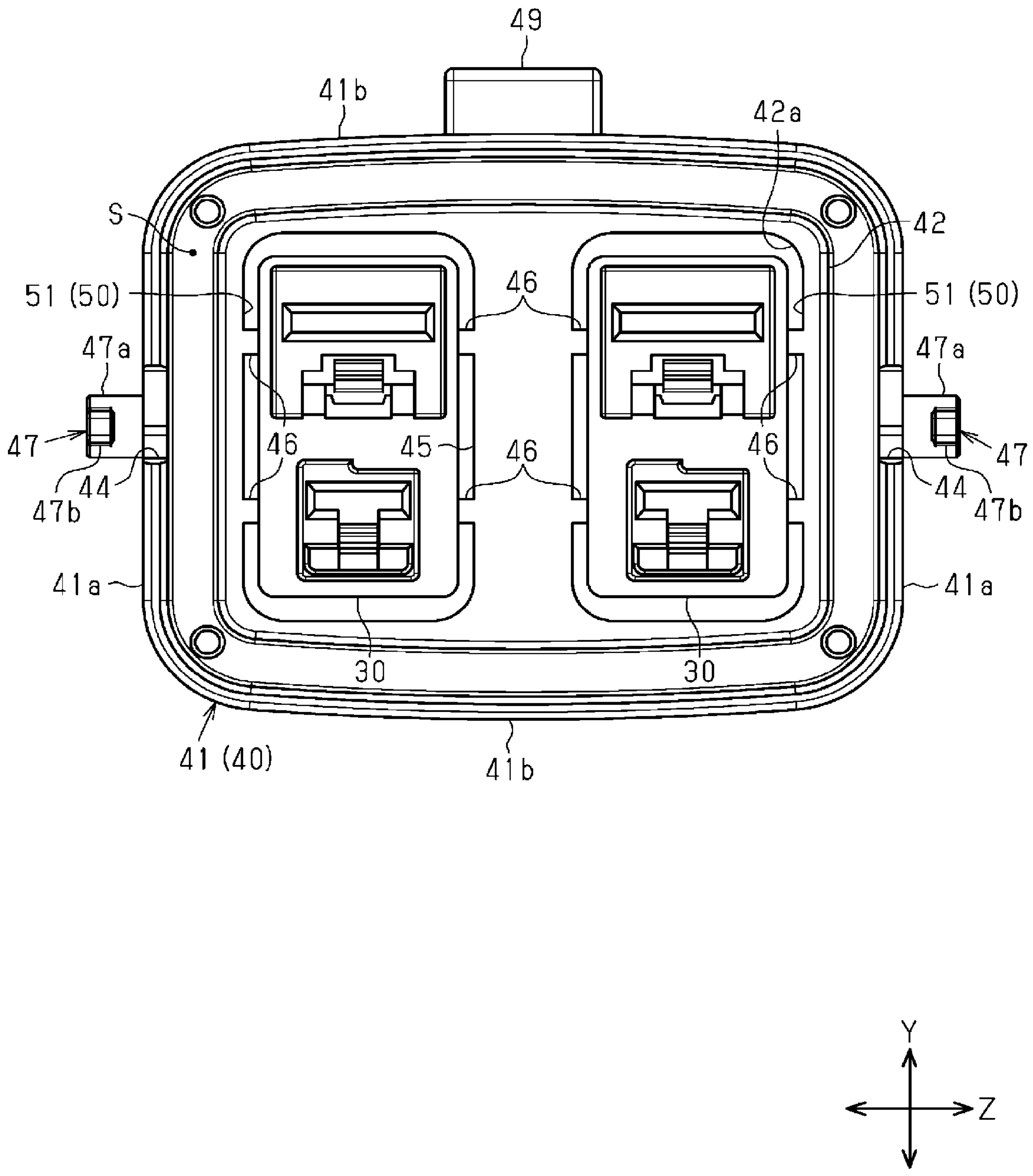
FIG. 5 is a front view showing a housing for the embodiment.

As shown in FIGS. 4 and 5, the housing 40 includes a partition wall 45 bisecting internal spaces of the inner tube portion 42 and the end part 43. The partition wall 45 extends along the first and second directions X, Y. Two accommodating portions 50 are configured by the partition wall 45, the inner peripheral surface 42*a* of the inner tube portion 42*a* and the inner peripheral surface 43*d* of the end part 43. The accommodating portions 50 are arranged in the third direction Z.

As shown in FIGS. 3 and 4, the accommodating portion 50 includes a first accommodating portion 51 for accommodating the shield member 70 and a second accommodating portion 52 for accommodating the first sealing member 81. The second accommodating portion 52 is configured by the inner peripheral surface 43*d* of the end part 43 on the side of the insertion opening 43*c* and the partition wall 45.

As shown in FIGS. 1 and 5, the housing 40 includes coupling portions 46, a pair of support shafts 47, escaping recesses 48 and an engaging portion 49.

As shown in FIG. 5, the coupling portions 46 couple the terminal holding portion 30, the inner tube portions 42 and the partition wall 45. In this embodiment, four coupling portions 46 are provided for one terminal holding portion 30. Out of the four coupling portions 46, two couple the terminal holding portion 30 and inner tube portion 42. The remaining two couple the terminal holding portion 30 and the partition wall 45.

As shown in FIGS. 4 and 5, the pair of support shafts 47 project toward mutually opposite sides from the outer surfaces of the side walls 41*a*. The support shafts 47 are located on the same axis along the third direction Z. The support shaft 47 is located in a center of the side wall 41*a* in the second direction Y.

The support shaft 47 includes a cylindrical shaft portion 47*a* and a pair of restricting protrusions 47*b* projecting toward mutually opposite sides from the outer peripheral surface of the tip of the shaft portion 47*a*. The restricting protrusions 47*b* are located on the same axis along the first direction X.

Figure 7:
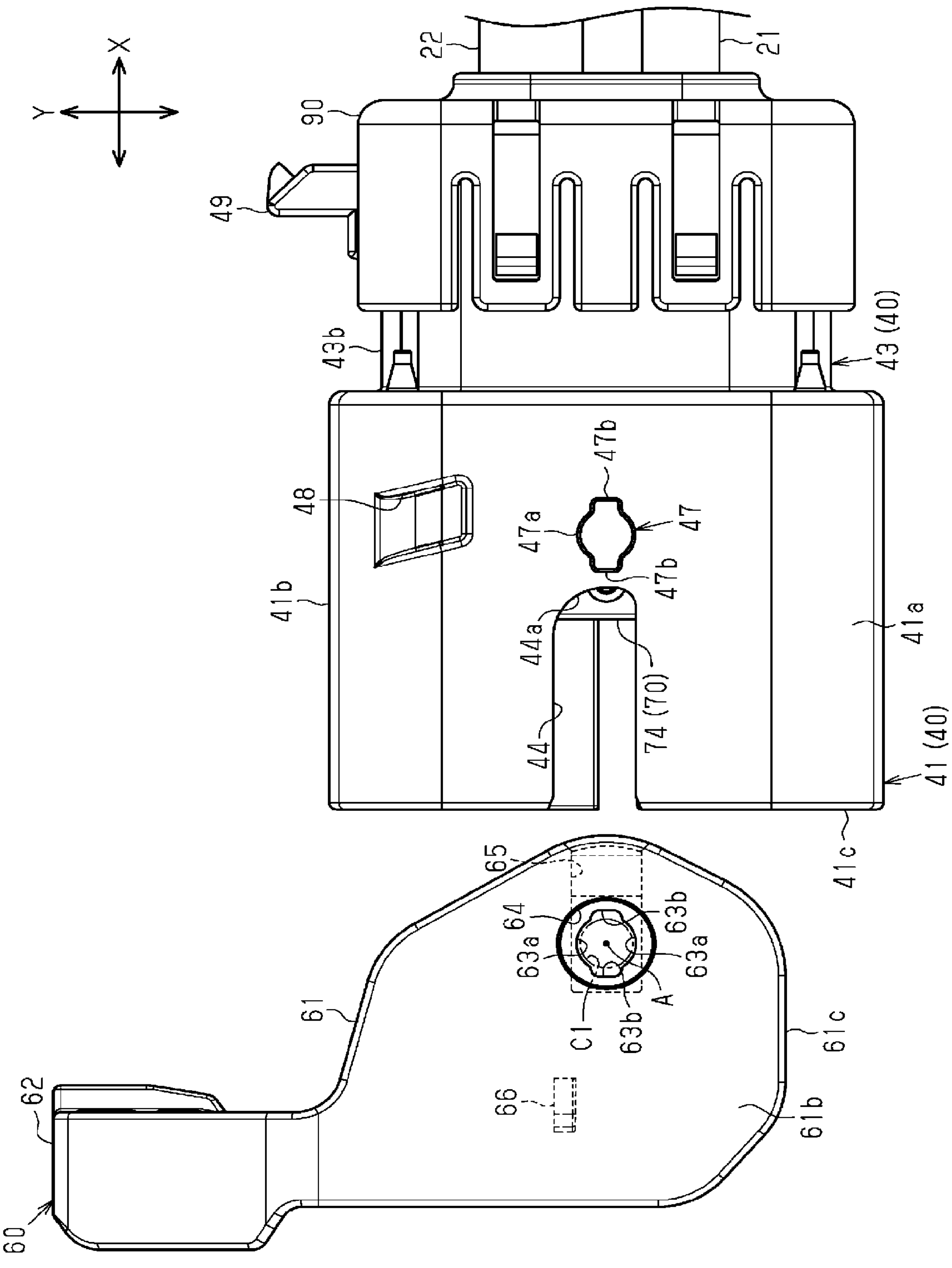
FIG. 7 is a side view showing the posture of the lever in mounting the lever on the housing.

As shown in FIGS. 2 and 7, the escaping recess 48 is provided in the outer surface of the side wall 41*a*. The escaping recess 48 is open toward one side (upper side in the vertical direction of FIG. 7) in the second direction Y. The escaping recess 48 is inclined to approach the end part 43 toward the other side (lower side in the vertical direction of FIG. 7) in the second direction Y. The escaping recess 48 is arranged side by side with the support shaft 47 in the second direction Y. The escaping recess 48 is located closer to the one side (upper side in the vertical direction of FIG. 7) of the side wall 41*a* in the second direction Y than the support shaft 47.

The engaging portion 49 projects from the outer surface of the coupling portion 43*b* on the one side (upper side in the vertical direction of FIG. 2) in the second direction Y, out of the coupling walls 43*b* of the end part 43.

The housing 40 is obtained by integrally molding the terminal holding portions 30, the receptacle 41, the inner tube portion 42, the end part 43, the cut portions 44, the partition wall 45, the accommodating portions 50, the coupling portions 46, the support shafts 47, the escaping recesses 48 and the engaging portion 49. An insulating material such as a synthetic resin material can be, for example, used as a material of the housing 40.

<Lever 60>

Figure 6:
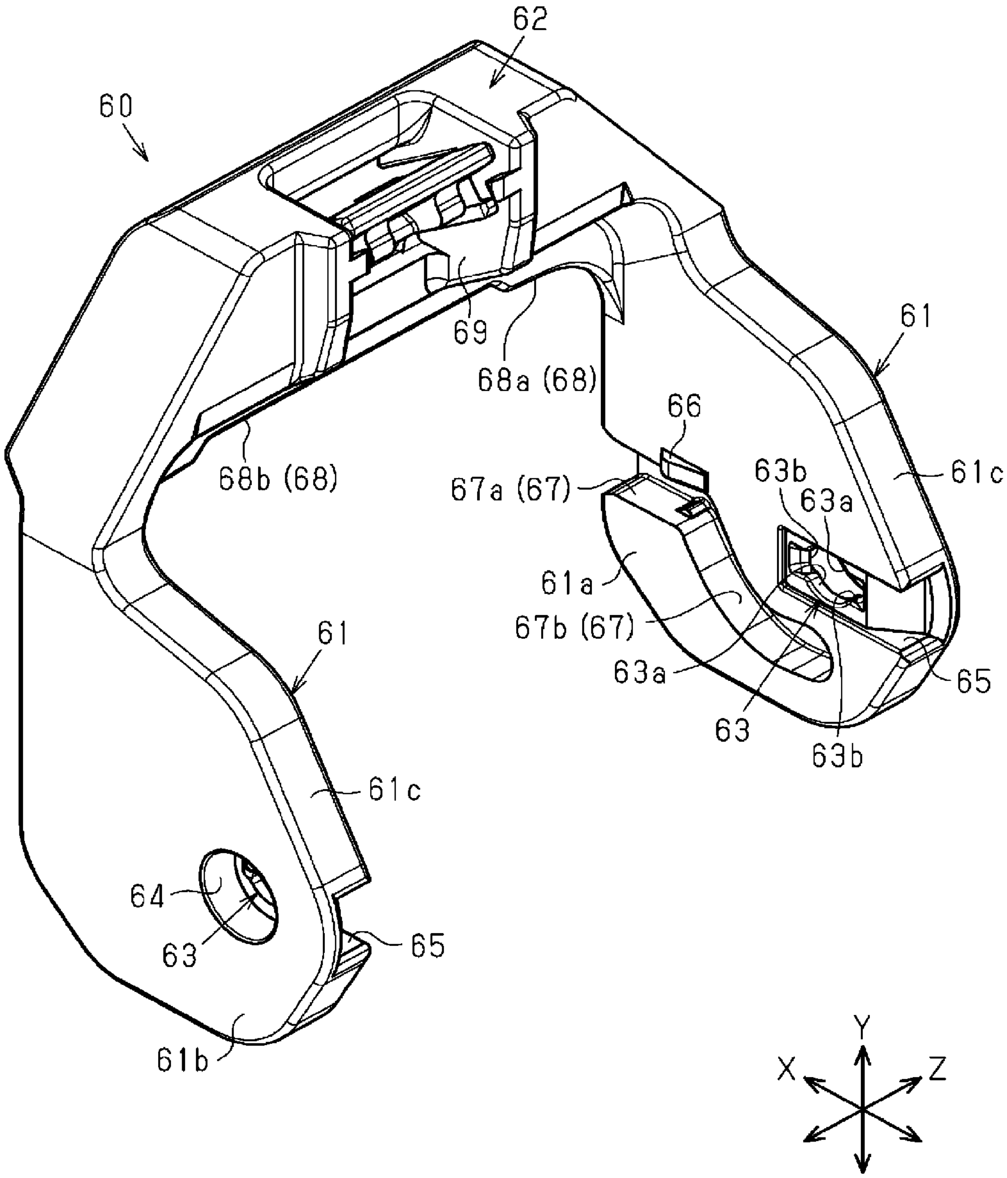
FIG. 6 is a perspective view showing a lever for the embodiment.

As shown in FIGS. 2 and 6, the lever 60 includes a pair of arm portions 61 and an operating portion 62 coupling the arm portions 61 to each other. The lever 60 is formed by continuously and integrally molding the pair of arm portions 61 and the operating portion 62, and gate-shaped. An insulating material such as a synthetic resin material can be, for example, used as a material of the lever 60.

Figure 9:
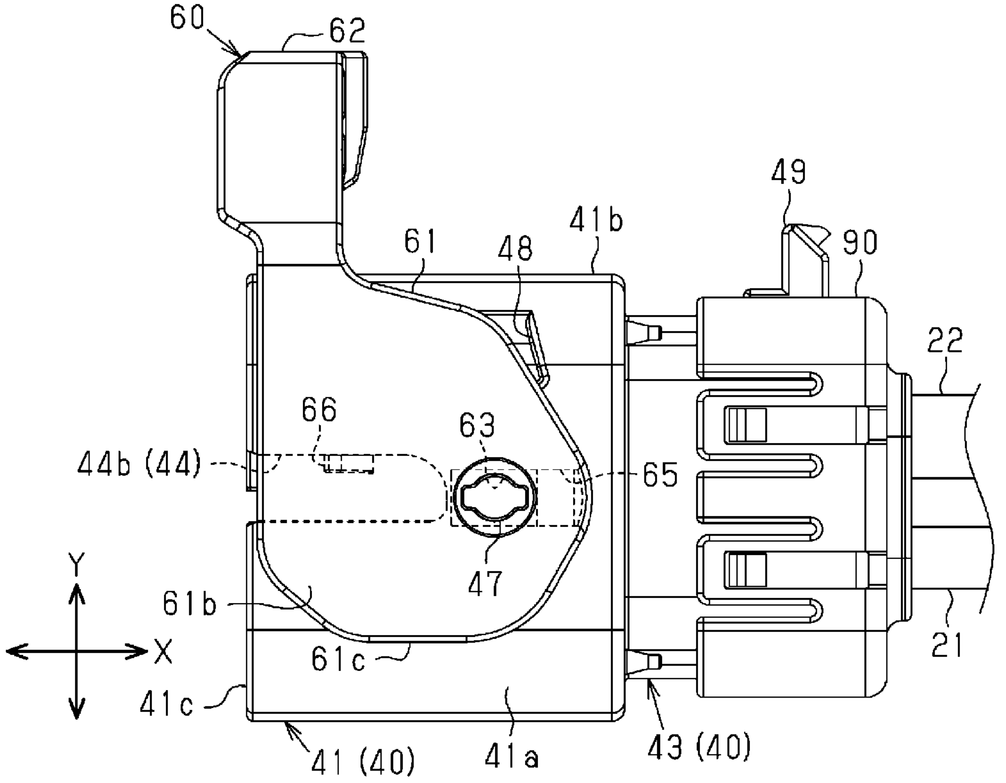
FIG. 9 is a side view of the lever-type connector.

Note that a position where the lever 60 is upright with respect to the first direction X, which is the axial direction of the housing 40, as shown in FIG. 9 is referred to as a first position below. Further, a position where the lever 60 is inclined away from the opening 41*c* with respect to the first position so that the operating portion 62 of the lever 60 approaches the base end of the housing 40 as shown in FIG. 12B is referred to as a second position.

<Arm Portions 61>

As shown in FIG. 1, the arm portion 61 is in the form of a flat plate and covers the side wall 41*a* from outside.

As shown in FIGS. 2 and 6, the arm portion 61 has an inner surface 61*a* facing the side wall 41*a*, an outer surface 61*b* located on a side opposite to the inner surface 61*a* and an outer peripheral surface 61*c* coupling end edges of the inner surface 61*a* and the outer surface 61*b*. Further, the arm portion 61 includes a support hole 63, an enlarged diameter portion 64, a guiding recess 65, an engaging protrusion 66 and a guiding groove 67.

The support hole 63 penetrates through the arm portion 61 in a plate thickness direction. By inserting the support shafts 47 of the housing 40 into the support holes 63, the lever 60 is rotatably supported on the housing 40 (see FIG. 1).

As shown in FIG. 7, the support hole 63 includes a pair of restricting edge parts 63*a* extending along a virtual circle C1 and configured to restrict the passage of the restricting protrusions 47*b* of the support shaft 47, and a pair of cuts 63*b* for allowing the passage of the restricting protrusions 47*b*. Note that the virtual circle C1 is a circle centered on a center axis A of the support hole 63.

The restricting edge parts 63*a* are facing each other along a direction orthogonal to the plate thickness direction (direction orthogonal to the plane of FIG. 7) of the arm portion 61.

As shown in FIG. 7, two cuts 63*b* are respectively located between the restricting edge parts 63*a*. The two cuts 63*b* are arranged along a direction (lateral direction of FIG. 7) orthogonal to both the plate thickness direction (direction orthogonal to the plane of FIG. 7) of the arm portion 61 and a facing direction (vertical direction of FIG. 7) of the restricting edge parts 63*a*.

The support shaft 47 and the support hole 63 are configured such that the passage of the support shaft 47 into the support hole 63 is allowed with the lever 60 located at the first position and, on the other hand, the passage of the support shaft 47 into the support hole 63 is hindered with the lever 60 located at a position other than the first position between the first and second positions by the restricting protrusions 47*b* and the restricting edge parts 63*a*.

Figure 8C:
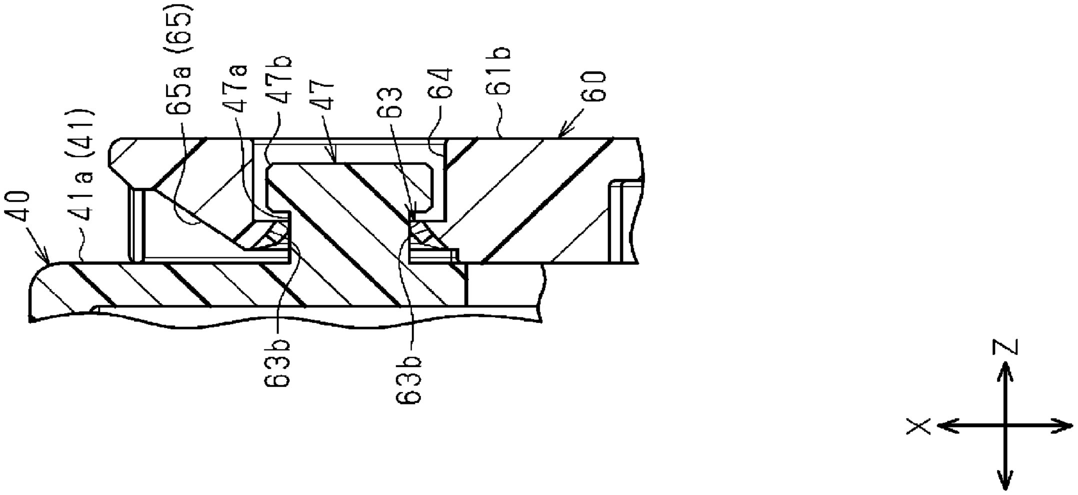
FIGS. 8A to 8C are sections showing a series of states when a support shaft is guided into a support hole by a guiding groove.
Figure 8B:
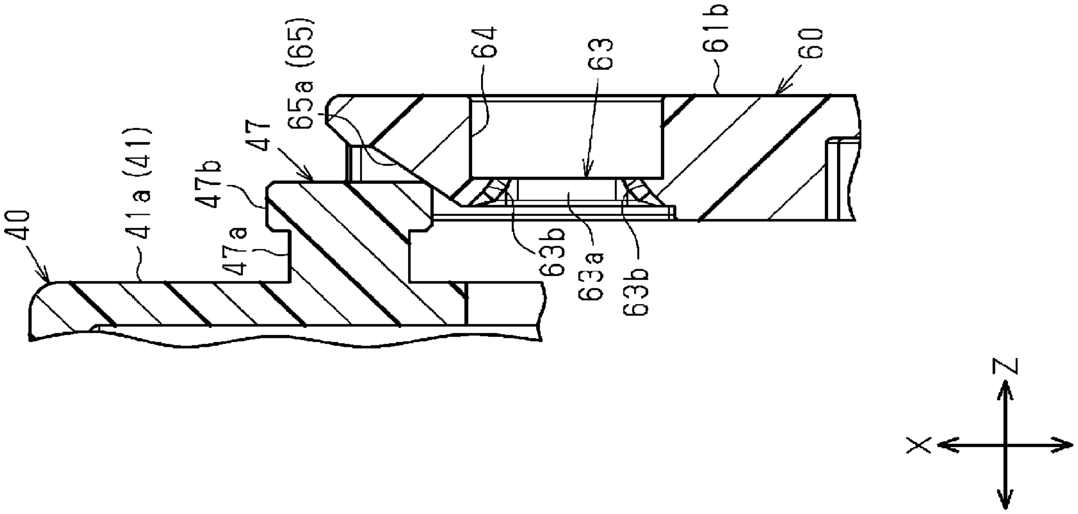
Figure 8A:
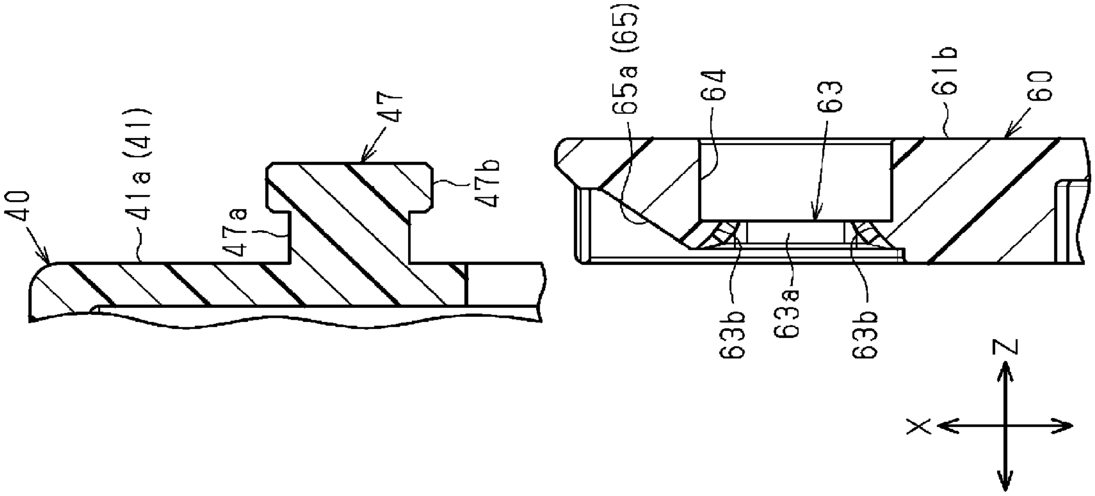

A state immediately before the support shaft 47 is inserted into the guiding recess 65 is shown in FIG. 8A. An intermediate state while the support shaft 47 is being guided into the support hole 63 by an inclined surface 65*a* is shown in FIG. 8B. A state where the support shaft 47 is inserted in the support hole 63 is shown in FIG. 8C.

Figure 12A:
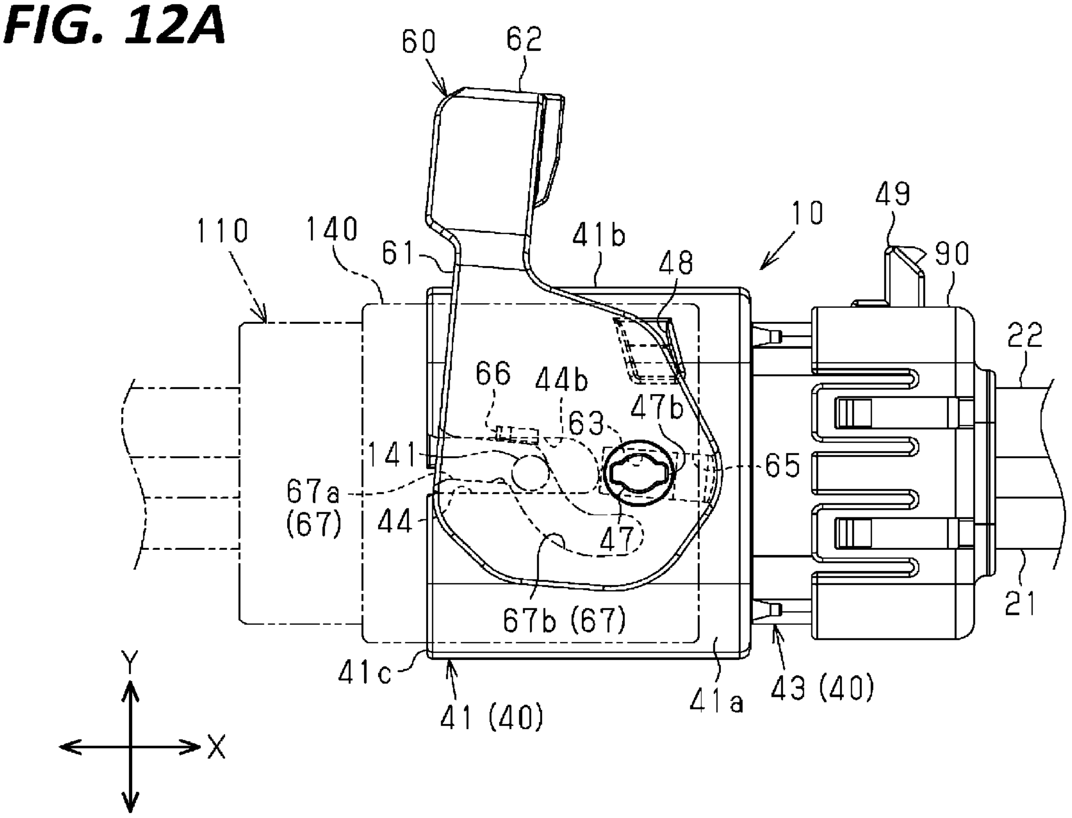
FIGS. 12A and 12B are side views showing a process of attaching the connector to a mating connector.
Figure 12B:
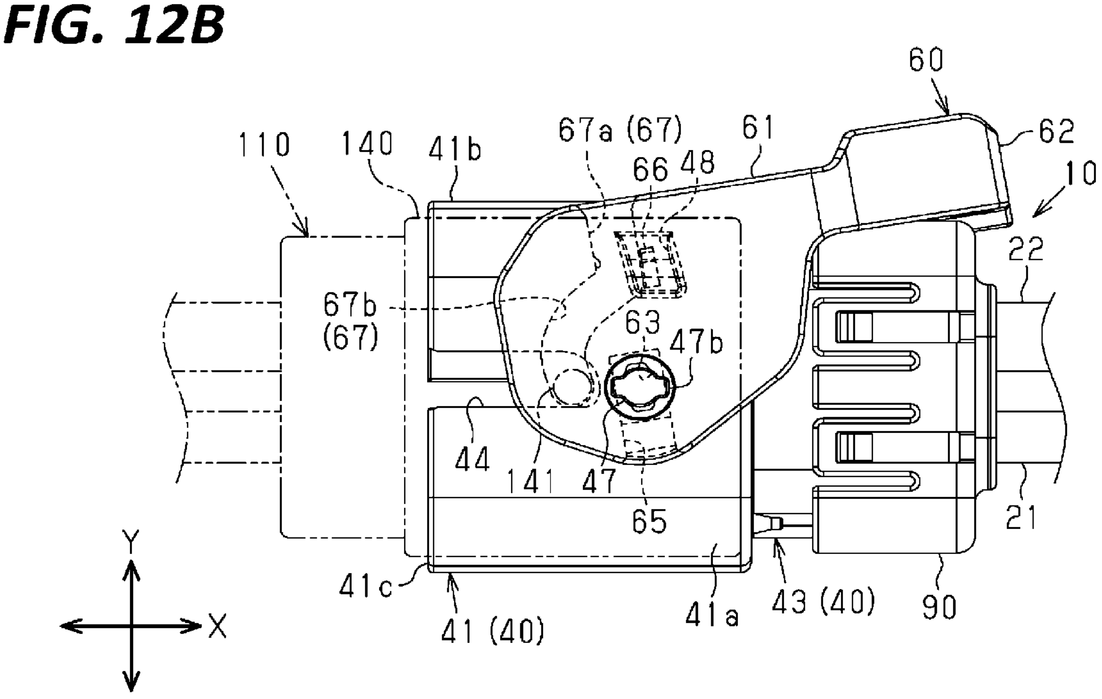

Further, a state where the housing 140 of the mating connector 110 is inserted in the housing 40 is shown in FIG. 12A. A state where the mating connector 110 is attached to the connector 10 is shown in FIG. 12B.

As shown in FIG. 7 and FIGS. 8A to 8C, the enlarged diameter portion 64 extends along the third direction Z from the support hole 63 and is open in the outer surface 61*b*. The enlarged diameter portion 64 is enlarged in diameter from the support hole 63 entirely in a circumferential direction with the center axis A of the support hole 63 as a center.

As shown in FIGS. 12A and 12B, the enlarged diameter portion 64 allows the restricting protrusions 47*b* rotating relative to the support hole 63 to escape when the lever 60 mounted on the housing 40 is rotated.

As shown in FIG. 6, the guiding recess 65 is provided in the inner surface 61*a* of the arm portion 61. The guiding recess 65 linearly extends from the outer peripheral surface 61*c* to the support hole 63 and is connected to the support hole 63. An end part of the guiding recess 65 on a side opposite to the support hole 63 is open in the outer peripheral surface 61*c*.

As shown in FIGS. 8A to 8C, the guiding recess 65 functions as a path for guiding the support shaft 47 into the support hole 63 when the lever 60 is assembled with the housing 40.

The guiding recess 65 has the inclined surface 65*a* located more inward in the plate thickness direction of the arm portion 61 toward the support hole 63 in an extending direction thereof.

Figure 10:
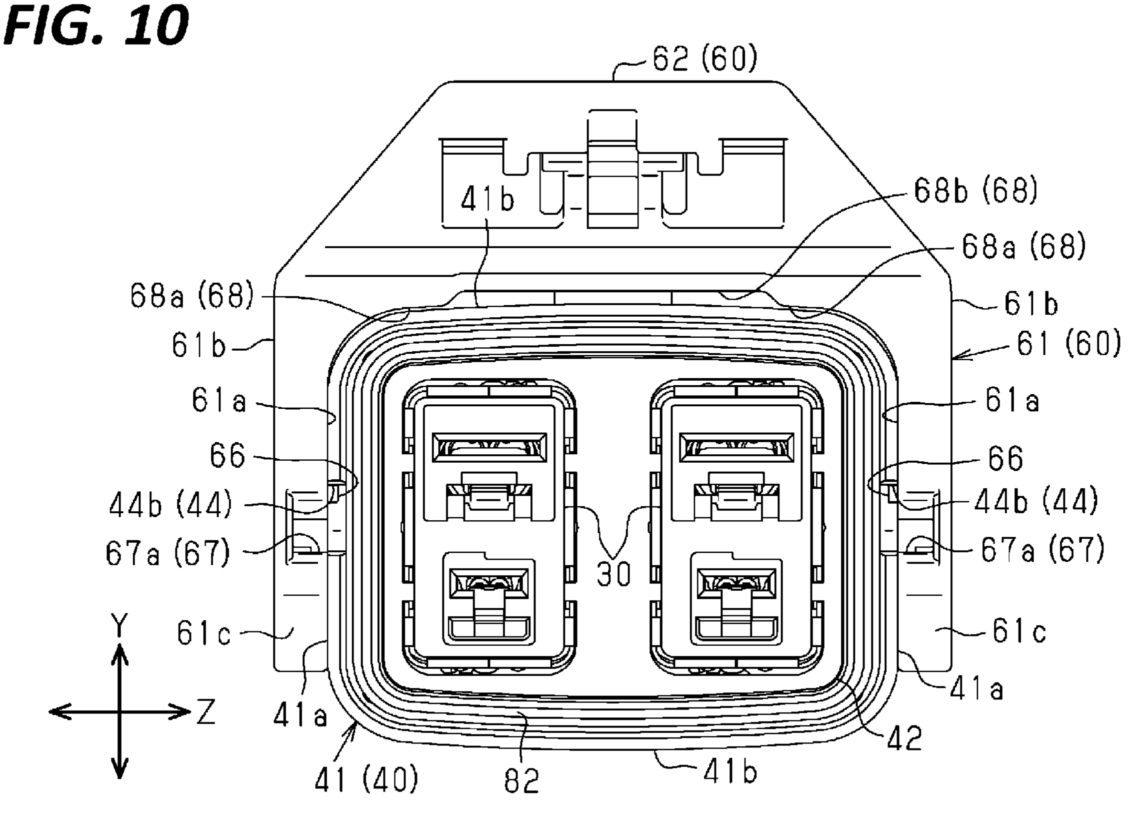
FIG. 10 is a front view of the lever-type connector.

As shown in FIGS. 6, 9 and 10, the engaging protrusion 66 is provided on the inner surface 61*a* of the arm portion 61. The engaging protrusion 66 projects toward the side wall 41*a* of the housing 40. The engaging protrusion 66 is provided at a position overlapping the cut portion 44 and the escaping recess 48 of the housing 40 in the circumferential direction with the lever 60 mounted on the housing 40.

The engaging protrusion 66 is configured to engage a wall portion 44*b* on one side (upper side in the vertical direction of FIG. 9) of the cut portion 44 in the second direction Y with the lever 60 located at the first position. This restricts the rotation of the lever 60 from the first position toward the second position, i.e. such a rotation of the lever 60 that the operating portion 62 of the lever 60 approaches the tip of the housing 40. Note that the cut portion 44 and the engaging protrusion 66 correspond to second restricting portions described in [Description of Embodiments of Present Disclosure].

As show in FIG. 12B, the engaging protrusion 66 is configured to escape into the escaping recess 48 with the lever 60 located at the second position.

As shown in FIG. 6 and FIGS. 12A and 12B, the guiding groove 67 is provided in the inner surface 61*a* of the arm portion 61. A guiding shaft portion 141 projecting from the housing 140 of the mating connector 110 is inserted into the guiding groove 67.

The guiding groove 67 includes an insertion portion 67*a*, into or from which the guiding shaft portion 141 is insertable or withdrawable, and a guiding portion 67*b* communicating with the insertion portion 67*a*.

The insertion portion 67*a* linearly extends along the first direction X with the lever 60 located at the first position. An end part of the insertion portion 67*a* on a side opposite to the guiding portion 67*b* is open in the outer peripheral surface 61*c*. The insertion portion 67*a* is open toward a side opposite to the guiding recess 65 with respect to the support hole 63.

The guiding portion 67*b* is formed to be more separated from the operating portion 62 from the insertion portion 67*a* toward the support hole 63. Further, the guiding portion 67*b* is formed to reduce a distance to the support shaft 47 from the insertion portion 67*a* toward the support hole 63.

<Operating Portion 62>

As shown in FIGS. 1 and 6, the operating portion 62 is provided between the pair of arm portions 61 and extends along the third direction Z. The operating portion 62 is facing the coupling wall 41*b* on the one side (upper side in the vertical direction of FIG. 1) in the second direction Y, out of the pair of coupling walls 41*b*, with the lever 60 located at the first position.

The operating portion 62 includes a protrusion 68 and an engaging hole 69.

As shown in FIGS. 1 and 10, the protrusion 68 projects from a surface facing the coupling wall 41*b* with the lever 60 located at the first position.

The protrusion 68 includes a pair of end parts 68*a* provided on both ends of the operating portion 62 in the third direction Z and a coupling portion 68*b* coupling the end parts 68*a*. The pair of end parts 68*a* are reinforced by the coupling portion 68*b*. A projecting height of the end part 68*a* is larger than that of the coupling portion 68*b*.

Figure 11:
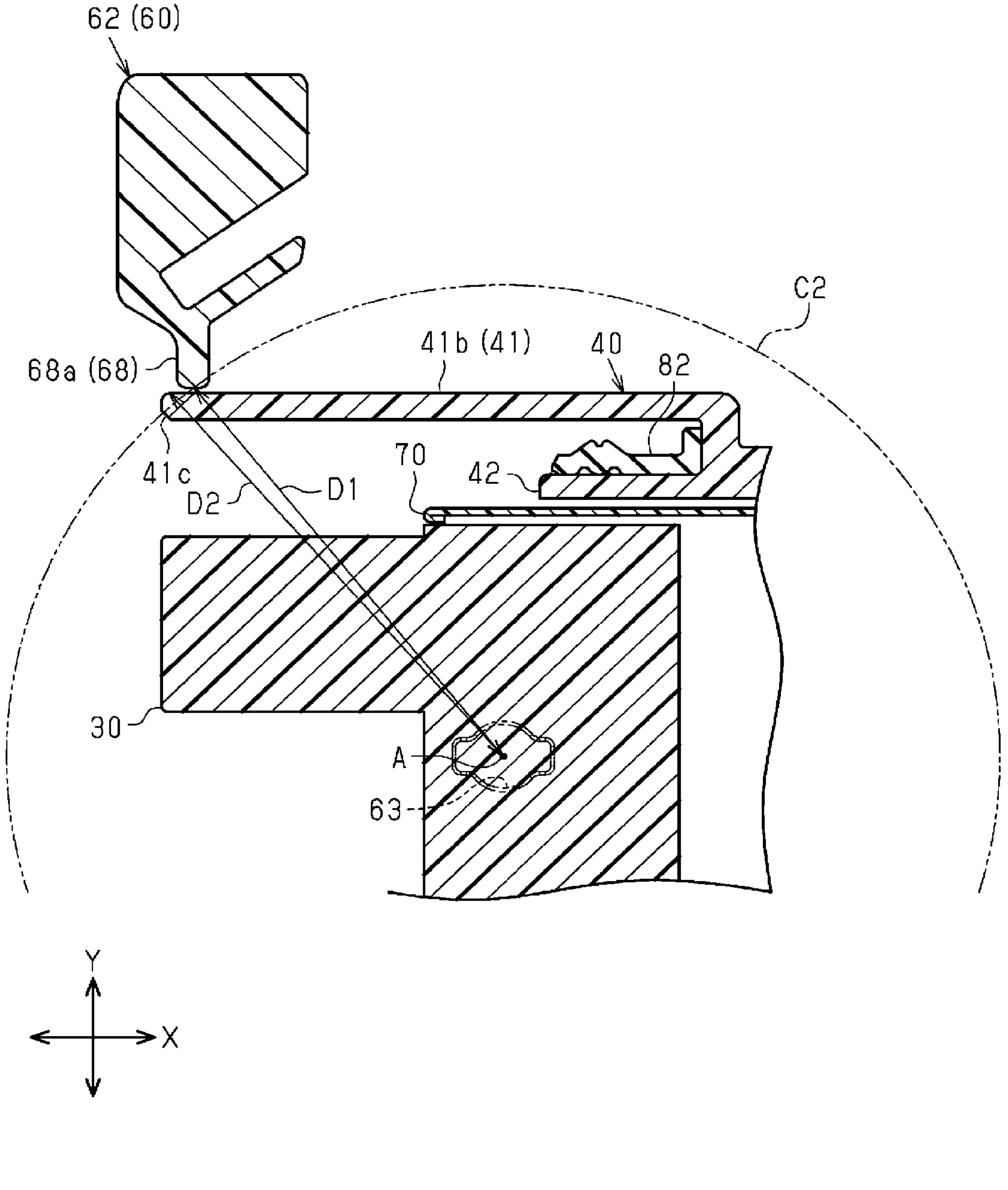
FIG. 11 is a section showing an operating portion and the housing with the lever located at a first position.

A virtual circle C2, which is a locus of the end parts 68*a* of the protrusion 68 when the lever 60 is rotated about the support shafts 47, is shown by a two-dot chain line in FIG. 11. Note that the virtual circle C2 is a circle centered on the center axis A.

As shown in FIG. 11, a distance D1 from the center axis A to the end part 68*a* is smaller than a distance D2 from the center axis A to an end part on the side of the opening 41*c* of the coupling wall 41*b* facing the operating portion 62.

The coupling wall 41*b* and the protrusion 68 overlap in a circumferential direction of the virtual circle C2 and interfere with each other, thereby restricting the rotation of the lever 60 from the first position toward the opening 41*c* (counterclockwise direction in FIG. 11). That is, the coupling wall 41*b* facing the operating portion 62 and the protrusion 68 correspond to first restricting portions described in [Description of Embodiments of Present Disclosure].

As shown in FIG. 6, the engaging hole 69 is located in a center of the operating portion 62 in the third direction Z. The engaging hole 69 is configured to hold the lever 60 at the second position by being engaged with the engaging portion 49 inserted thereinto.

<Shield Members 70>

As shown in FIGS. 2 to 4, the shield member 70 is in the form of a tube made of metal and extending along the first direction X and accommodated in the first accommodating portion 51. The shield member 70 covers the outer periphery of the terminal holding portion 30 inside the housing 40. That is, the shield member 70 covers the outer peripheries of the first and second terminals 23, 24. In this embodiment, one shield member 70 is provided in each first accommodating portion 51. The shield members 70 have the same shape. The shield member 70 has a rectangular cross-sectional shape long in the second direction Y.

The shield member 70 includes a pair of side wall portions 71 and a pair of coupling wall portions 72 coupling the side wall portions 71.

Each side wall portion 71 is formed with two cut portions 73. The cut portions 73 are configured to allow the coupling portions 46 of the housing 40 to escape when the shield member 70 is inserted into the housing 40.

As shown in FIGS. 4 and 7, the shield member 70 and the cut portion 44 of the housing 40 overlap in the third direction Z. In particular, an end part 74 on one side (lower side in the vertical direction of FIG. 4) of the shield member 70 in the first direction X is located closer to the opening 41*c* than an end part 44*a* on the other side (upper side in the vertical direction of FIG. 4) of the cut portion 44 in the first direction X.

<Sealing Members 81, 82>

As shown in FIGS. 4 and 5, the first sealing member 81 is configured to be insertable into the housing 40 along the first direction X from the side of the opening 43*c*. The first sealing member 81 is accommodated in the second accommodating portion 52. In this embodiment, one first sealing member 81 is provided in each second accommodating portion 52. The first sealing members 81 have the same shape.

The first sealing member 81 seals between the outer peripheral surfaces of the first and second wires 21, 22 and the inner peripheral surface 43*d* of the end part 43.

As shown in FIGS. 3 and 4, the connector 10 includes a second sealing member 82. The second sealing member 82 is provided in the gap S between the inner tube portion 42 and the receptacle 41. In particular, the second sealing member 82 is tubular and provided over the entire outer peripheral surface of the inner tube portion 42 in a circumferential direction. The second sealing member 82 seals between the outer peripheral surface of the inner tube portion 42 and the inner peripheral surface of the housing 140 (not shown) of the mating connector 110.

The first and second sealing members 81, 82 are, for example, made of rubber.

<Retainer 90>

As shown in FIGS. 1 to 4, the retainer 90 is mounted on the end part 43 of the housing 40. The retainer 90 is tubular, covers the end part 43 from outside and holds the first sealing members 81. An insulating material such as a synthetic resin material can be, for example, used as a material of the retainer 90.

<Method for Mounting Lever 60 on Connector 10>

As shown in FIG. 7, the lever 60 is relatively brought closer to the housing 40 in a posture at the first position from one side (left side in the lateral direction of FIG. 7) in the first direction X.

As shown in FIGS. 8A to 8C, if the support shafts 47 of the housing 40 are inserted into the guiding recesses 65 of the lever 60, the support shafts 47 are guided along the inclined surfaces 65*a* and inserted into the support holes 63. In this way, the lever 60 is mounted on the housing 40 at the first position (see FIG. 9).

<Method for Attaching Connectors 10, 110>

To attach the mating connector 110 to the connector 10, the mating connector 110 is relatively brought closer to the connector 10. At this time, the lever 60 is held at the first position by the first restricting portions constituted by the coupling wall 41*b* of the housing 40 and the protrusion 68 of the lever 60 and the second restricting portions constituted by the cut portions 44 of the housing 40 and the engaging protrusions 66 of the lever 60.

As shown in FIG. 12A, the guiding shaft portions 141 of the mating connector 110 are inserted into the insertion portions 67*a* of the guiding grooves 67 in the lever 60. At this time, the engaging protrusions 66 interfere with the guiding shaft portions 141. If the guiding shaft portions 141 are further inserted from here, insertion forces of the guiding shaft portions 141 act, whereby the engaging protrusions 66 ride over the wall portions 44*b* of the cut portions 44 and move toward the one side (upper side in the vertical direction of FIG. 12A) in the second direction Y. In this way, the rotation restriction of the lever 60 by the second restricting portions is released.

Next, as shown in FIG. 12B, the lever 60 is rotated toward the second position. At this time, the guiding shaft portions 141 relatively move with respect to the guiding portions 67*b* of the guiding grooves 67 and are guided to end parts of the guiding portions 67*b* on a side opposite to the insertion portions 67*a*. Here, distances of the guiding portions 67*b* from the support shafts 47 decrease from the insertion portions 67*a* toward the support holes 63. In this way, as the lever 60 is rotated from the first position toward the second position, the connector 10 moves toward the mating connector 110 to reduce the distances between the support shafts 47 and the guiding shaft portions 141. That is, a rotational motion of the lever 60 is converted into a linear motion of the connector 10 via the guiding shaft portions 141 and the guiding grooves 67. Thereafter, the engaging portion 49 of the housing 40 is engaged with the engaging hole 69 of the operating portion 62. In this way, the lever 60 is held at the second position and the connector 10 is attached to the mating connector 110.

Further, by rotating the lever 60 from the second position to the first position, the connector 10 is detached from the mating connector 110.

Functions of this embodiment are described.

The coupling wall 41*b* facing the operating portion 62 and the protrusion 68 of the lever interfere with each other, thereby restricting the rotation of the lever 60 from the first position toward the opening 41*c*. In this way, it is suppressed that the lever 60 rotates from the first position toward the opening 41*c* against a worker's intention and interrupts the worker's operation when the worker attaches or detaches the connector 10 and the mating connector 110.

Effects of this embodiment are described.

(1) The housing 40 and the lever 60 include the coupling wall 41*b* and the protrusion 68 serving as the first restricting portions for restricting the rotation of the lever 60 from the first position toward the opening 41*c* by interfering with each other. The first restricting portions include the coupling wall 41*b* facing the operating portion 62 with the lever 60 located at the first position.

According to this configuration, the aforementioned function is achieved. Therefore, the connector 10 and the mating connector 110 can be easily attached and detached.

(2) The first restricting portions include the protrusion 68 projecting from the operating portion 62.

According to this configuration, the rotation of the lever 60 from the first position toward the opening 41*c* is restricted by the mutual interference of the protrusion 68 projecting from the operating portion 62 and the coupling wall 41*b* facing the operating portion 62.

Further, according to the above configuration, the coupling wall 41*b* facing the operating portion 62 can be simply configured by providing the protrusion 68 serving as the first restricting portion on the lever 60.

(3) The plurality of terminals 23, 24 are provided inside the housing 40. The plurality of terminals 23, 24 are arranged in the second direction Y, which is a facing direction of the coupling walls 41*b*.

To set the first restricting portions on the housing 40 and the lever 60, a gap between the coupling wall 41*b* facing the operating portion 62 and the lever 60 needs to be reduced in size as compared to conventional lever-type connectors.

Further, in providing the plurality of terminals 23, 24 inside the housing 40, at least one of an interval between the side walls 41*a* and an interval between the coupling walls 41*b* needs to be increased.

According to the above configuration, the interval between the coupling walls 41*b* increases by providing the plurality of terminals 23, 24 in parallel in the second direction Y. Here, it can be suppressed the build of the connector 10 increases in the second direction Y by utilizing a part of an increase in the interval between the coupling walls 41*b* to reduce the gap between the coupling wall 41*b* facing the operating portion 62 and the operating portion 62.

(4) The housing 40 includes the pair of support shafts 47 projecting toward the mutually opposite sides from the outer surfaces of the pair of side walls 41*a*. The arm portions 61 include the support holes 63, into which the support shafts 47 are inserted. The support shafts 47 and the support holes 63 include the restricting protrusions 47*b* and the restricting edge parts 63*a* having convex and concave parts for allowing the passage of the support shafts 47 into the support holes 63 with the lever 60 located at the first position and, on the other hand, hindering the passage of the support shafts 47 into the support holes 63 with the lever 60 located at a position other than the first position between the first position and the second position.

According to this configuration, the lever 60 is mounted on the housing 40 while being at the first position. Thus, the worker can quickly rotate the lever 60 toward the second position from the state where the lever 60 is mounted on the housing 40. Therefore, an operation from the assembling of the connector 10 to the attachment of the connector 10 to the mating connector 110 can be performed without waste.

Further, according to the above configuration, the restricting protrusions 47*b* and the restricting edge parts 63*a* having the convex and concave shapes and provided on the support shafts 47 and in the support holes 63 interfere with each other to hinder the passage of the support shafts 47 into the support holes 63 with the lever 60 located at a position other than the first position between the first position and the second position. Therefore, the detachment of the lever 60 can be suppressed at the time of attachment to or detachment from the mating connector 110.

(5) The arm portion 61 includes, in the inner surface 61*a* thereof, the guiding groove 67 to be engaged with the guiding shaft portion 141 projecting from the housing 140 of the mating connector 110 and configured to guide a relative movement of the guiding shaft portion 14 in rotating the lever 60 between the first and second positions. The side wall 41*a* includes the cut portion 44 for allowing the guiding shaft portion 141 to escape.

According to this configuration, if the lever 60 is rotated from the first position to the second position, the guiding grooves 67 provided in the inner surfaces 61*a* of the arm portions 61 are engaged with the guiding shaft portions 141 and guide relative movements of the guiding shaft portions 141. In this way, the connector 10 is attached to the mating connector 110.

If the side walls 41*a* are not provided with the cut portions 44, the guiding shaft portions 141 interfere with the side walls 41*a* in attaching the mating connector 110 to the connector 10, wherefore the guiding shaft portions 141 cannot be inserted into the guiding grooves 67. Accordingly, it is considered to provide the guiding grooves 67 in the outer surfaces 61*b* of the arm portions 61 of the lever 60 and provide the guiding shaft portions 141 on the mating connector 110 to be engaged with the guiding grooves 67. However, in this case, the build of the mating connector 110 increases in the third direction Z, which is the facing direction of the side walls. In that respect, according to the above configuration, the guiding grooves 67 can be provided in the inner surfaces 61*a* of the arm portions 61 of the lever 60 by providing the cut portions 44 in the side walls 41*a*. Therefore, an increase in the build of the mating connector 110 in the third direction Z can be suppressed and, consequently, an increase in the build of the entire connector device in the third direction Z can be suppressed.

(6) The housing 40 and the lever 60 include the second restricting portions for restricting the rotation of the lever from the first position toward the second position by being engaged with each other. The second restricting portions are constituted by the cut portions 44 and the engaging protrusions 66 provided on the inner surfaces 61*a* of the arm portions 61 and to be engaged with the cut portions 44 with the lever 60 located at the first position.

According to this configuration, since the rotation of the lever 60 in both directions is restricted by both the first restricting portions and the second restricting portions with the lever 60 located at the first position, the posture of the lever 60 is held. In this way, it is further suppressed that the lever 60 interrupts the worker's operation due to the rotation of the lever 60 against the worker's intention when the worker attaches or detaches the connector 10 and the mating connector 110. Therefore, the connector 10 and the mating connector 110 can be more easily attached and detached.

(7) The side walls 41*a* include the escaping recesses 48 for allowing the engaging protrusions 66 to escape with the lever 60 located at the second position.

According to this configuration, the engaging protrusions 66 are allowed to escape by the escaping recesses 48 when the lever 60 is rotated from the first position to the second position. Therefore, the mutual interference of the lever 60 and the side walls 41*a* of the housing 40 at the second position can be suppressed.

(8) The shield members 70 in the form of metal tubes are provided inside the housing 40 and cover the outer peripheries of the plurality of terminals 23, 24. The gap S for allowing the insertion of the housing 140 of the mating connector 110 is provided between the housing 40 and the shield members 70. The shield members 70 and the cut portions 44 overlap in the third direction Z.

According to this configuration, the plurality of terminals 23, 24 can be electromagnetically shielded by the shield members 70 provided inside the housing 40.

Further, according to the above configuration, the end parts 74 of the shield members 70 in the first direction X, which is the axial direction of the housing 40, can be located close to the opening 41*c*. Therefore, shielding performance by the shield members 70 can be enhanced as compared to the case where the shield members 70 and the cut portions 44 do not overlap in the third direction Z.

(9) The second sealing member 82 is provided inside the housing 40 and seals between the housing 40 and the housing 140 of the mating connector 110.

According to this configuration, the intrusion of external matters such as mud and water through a gap between the housing 40 of the connector 10 and the housing 140 of the mating connector 110 is suppressed by the second sealing member 82. Therefore, the intrusion of external matters into the housings 40, 140 can be suppressed.

<Modifications>

This embodiment can be modified and carried out as follows. This embodiment and the following modifications can be carried out in combination without technically contradicting each other.

The terminal holding portions 30 may not be coupled to the inner tube portion 42 as illustrated in this embodiment. For example, the terminal holding portions 30 may be coupled to the inner surface of the receptacle 41. In this case, the inner tube portion 42 can be omitted.

The second sealing member 82 may be omitted. Since the cut portions 44 are covered from outside by the arm portions 61 of the lever 60 even in this case, the intrusion of external matters into the housings 40, 140 through the cut portions 44 is suppressed.

The first sealing members 81 are not limited to those illustrated in this embodiment and a first sealing member may collectively cover a plurality of wire pairs.

The shield member 70 may be omitted.

The number of the engaging protrusions 66 is not limited to that illustrated in this embodiment. For example, two or more engaging protrusions may be provided on the inner surface 61*a* of each arm portion 61. In this case, the number or shape of the escaping recesses 48 may be changed as appropriate according to the number of the engaging protrusions 66. For example, one escaping recess 48 may be provided for each engaging protrusion 66 or the escaping recess 48 may be shaped to collectively allow a plurality of the engaging protrusions 66 to escape.

The second restricting portions are not limited to those constituted by the cut portions 44 and the engaging protrusions 66. For example, recesses to be engaged with the engaging protrusions 66 may be separately provided in the side walls 41*a* of the housings 40, and the second restricting portions may be constituted by these recesses and the engaging protrusions 66. In this case, the arrangement of the engaging protrusions 66 can be changed as appropriate.

The engaging protrusion 66 is not limited to the one provided on the inner surface 61*a* of the arm portion 61 as illustrated in this embodiment. For example, the engaging protrusion 66 may be provided on the side wall 41*a* of the housing 40. In this case, a recess to be engaged with the engaging protrusion may be provided at a position corresponding to the engaging protrusion provided on the side wall 41*a* with the lever 60 located at the first position, and the second restricting portions may be constituted by this recess and the engaging protrusion.

The second restricting portions may be omitted. That is, the engaging protrusions 66 may be omitted. In this case, the escaping recesses 48 can be omitted from the housing 40.

The guiding grooves 67 are not limited to those provided in the inner surfaces 61*a* of the arm portions 61 as illustrated in this embodiment. For example, guiding grooves may be provided in the outer surfaces 61*b* of the arm portions 61. In this case, the cut portions 44 can be omitted.

The guiding recess 65 is not limited to the one illustrated in this embodiment. For example, the inclined surface 65*a* may be omitted.

The guiding recesses 65 can be omitted.

The shape of the support shaft 47 is not limited to the one illustrated in this embodiment. For example, the support shaft 47 may include one restricting protrusion 47*b* or three or more restricting protrusions 47*b*. In this case, the shape of the support hole 63 is not limited to the one illustrated in this embodiment and can be changed as appropriate in conformity with the shape of the support shaft 47. That is, the support hole 63 may include one restricting edge part 63*a* and one cut 63*b* or may include three or more restricting edge parts 63*a* and three or more cuts 63*b*.

The lever 60 is not limited to the one to be mounted on the housing 40 at the first position. For example, the lever 60 may be mounted on the housing 40 at a third position between the first and second positions. In this case, the support shafts 47 and the support holes 63 are not limited to those illustrated in this embodiment and may have, for example, convex and concave parts to allow the passage of the support shaft 47 into the support hole 63 with the lever 60 located at the third position and, on the other hand, hinder the passage of the support shaft 47 into the support hole 63 with the lever 60 located at a position other than the third position.

The support shaft 47 is not limited to the one projecting from the side wall 41*a* of the housing 40 and may be, for example, provided on the arm portion 61 of the lever 60. In this case, a support recess corresponding to the support hole 63 may be provided in the side wall 41*a* of the housing 40.

The numbers of the first and second wires 21, 22 are not limited to two as illustrated in this embodiment, one first wire 21 and one second wire 22 may be provided or three or more first wires 21 and three or more second wires 22 may be provided. In this case, the number of the terminal holding portions 30 may be changed as appropriate according to the numbers of the wires 21, 22.

The arrangement of the first and second wires 21, 22 is not limited to that illustrated in this embodiment. For example, the first and second wires 21, 22 may be arranged in an order opposite to that of this embodiment along the second direction Y. In this case, the arrangement of the terminals 23, 24 to be held in the terminal holding portions 30 may be changed as appropriate according to the arrangement of the wires 21, 22.

The connector 10 is not limited to the one including the first and second wires 21, 22 and may include, for example, only either the first wires 21 or the second wires 22.

The shape of the protrusion 68 is not limited to that illustrated in this embodiment. For example, the projecting height of the coupling portion 68*b* may be equal to those of the end parts 68*a* or the coupling portion 68*b* may be omitted.

The first restricting portion is not limited to the protrusion 68 projecting from the operating portion 62 as illustrated in this embodiment. For example, a protrusion may be provided on the inner surface 61*a* of the arm portion 61 or protrusions may be provided on both the arm portion 61 and the operating portion 62.

The first restricting portions are not limited to those constituted by the protrusion provided on the lever 60 and the coupling wall 41*b* of the housing 40. For example, a protrusion may be provided on the coupling wall 41*b* facing the operating portion 62 with the lever 60 located at the first position, and the first restricting portions may be constituted by this protrusion and the operating portion 62.

As shown in FIGS. 1 and 11, the protrusion 68 of the operating portion 62 may be in contact with the end part near the opening 41*c* of the coupling wall 41*b* (and the side walls 41*a*) or in proximity to this end via a small gap with the lever 60 located at the first position.

As shown in FIGS. 1 and 11, the protrusion 68 of the operating portion 62 may be located closer to the opening 41*c* than the support shafts 47 in the axial direction (first direction X) of the housing 40 with the lever 60 located at the first position.

As shown in FIGS. 2 and 6, the coupling wall 41*b* (and the side walls 41*a*) may not be configured to be engaged with the protrusion 68 of the operating portion 62.

In the shown embodiment, the operating portion 62 of the lever 60 may be referred to a bridge or bridge shaped operating portion extending between a pair of arm portions 61.

The opening 41*c* of the receptacle 41 of the housing 40 may be referred to as a front opening for allowing the insertion of the mating connector 110. The housing 40 can include a rear pull-out opening for pulling out the first and second wires 21, 22. As shown in FIG. 11, the receptacle 41 can include a front end part defining the opening 41*c*. In the example shown in FIG. 11, the front end part of the receptacle 41 is located on a rotation locus (virtual circle C2) of a predetermined part of the lever 60. This front end part of the receptacle 41 limits a forward maximum rotation position of the lever 60 by directly contacting the predetermined part of the lever 60. The front end part of the receptacle 41, particularly a radially outward facing surface of that front end part, may be referred to as a lever rotation stopper for limiting the forward maximum rotation position of the lever 60 by directing contacting the predetermined part of the lever 60. The predetermined part of the lever 60 is possibly the operating portion 62 or the protrusion 68 of the lever 60. The predetermined part of the lever 60 may be a predetermined local part of the lever 60.

In the shown embodiment, the support shaft 47 (particularly, the cylindrical shaft portion 47*a*) may be referred to as a rotary shaft or axis of rotation of the lever 60. The front end part of the receptacle 41 is relatively distant from the support shaft 47. This separation distance from the support shaft 47 to the front end part of the receptacle 41 is advantageous in reducing the minimum mechanical strength of the front end part of the receptacle 41 required to stop a forward rotational motion of the lever 60 by the front end part of the receptacle 41 directly contacting the lever 60 being rotated forward. For example, even if the front end part of the receptacle 41 has a relatively low mechanical strength, the front end part of the receptacle 41 can stop a forward rotational motion of the lever 60 by directly contacting the lever 60 being rotated forward and limit the forward maximum rotation position of the lever 60. The setting of the front end part of the receptacle 41 as the lever rotation stopper is advantageous in reducing the weight or material cost of the receptacle 41. The predetermined part of the lever 60 to be directly contacted by the front end part of the receptacle 41 may be similarly configured to have a relatively low mechanical strength, which is advantageous in reducing the weight or material cost of the lever 60.

The present disclosure includes the following embodiments. Reference numerals of several constituent elements of illustrative embodiments are given not for limitation, but for understanding assistance. Matters described in the following embodiments may be partly omitted or several of the matters described in the embodiments may be selected or extracted and combined.

[Addendum 1] A lever-type connector (10) according to a certain embodiment of the present disclosure may be provided with:

a plurality of terminals (23, 24);

a housing (40) configured to accommodate the plurality of terminals (23, 24) and tips of a plurality of wires (21, 22) respectively connected to the plurality of terminals (23, 24);

a lever (60); and a rotary shaft (47*a*) for rotatably coupling the lever (60) to the housing (40), the housing (40) may include a receptacle (41) having a front end part defining a front opening (41*c*) for allowing insertion of a mating connector (110), and a rear pull-out opening (a part of 43) for pulling out the plurality of wires (21, 22) from the housing (40), the lever (60) may be configured to rotate forward and rearward about the rotary shaft (47*a*), and the front end part of the receptacle (41) may function as a lever rotation stopper for limiting a forward maximum rotation position of the lever (60) by directly contacting a predetermined part (62, 68) of the lever (60) distant from the support shaft (47) when the lever (60) rotates forward, for example, as shown in FIG. 11.

[Addendum 2] As shown in FIG. 11, in a certain embodiment of the present disclosure, a radially outward facing surface of the front end part of the receptacle (41) may function as the lever rotation stopper for limiting the forward maximum rotation position of the lever (60) when the lever (60) rotates forward.

[Addendum 3] In a certain embodiment of the present disclosure, the lever (60) may be provided with two arm portions (61) and a bridge (62) extending between the two arm portions (61), and the predetermined part (62, 68) of the lever (60) may be the bridge (62) between the two arm portions (61) or may be included in the bridge (62).

LIST OF REFERENCE NUMERALS

A center axis
C1 virtual circle
C2 virtual circle
D1 distance
D2 distance
S gap
X first direction
Y second direction
Z third direction
10 connector
21 first wire
22 second wire
23 first terminal
24 second terminal
30 terminal holding portion
40 housing
41 receptacle
41*a* side wall
41*b* coupling wall
41*c* opening
42 inner tube portion
42*a* inner peripheral surface
43 end part
43*a* side wall
43*b* coupling wall
43*c* insertion opening
43*d* inner peripheral surface
44 cut portion
44*a* end part
44*b* wall portion
45 partition wall
46 coupling portion
47 support shaft
47*a* shaft portion
47*b* restricting protrusion
48 escaping recess
49 engaging portion
50 accommodating portion
51 first accommodating portion
52 second accommodating portion
60 lever
61 arm portion
61*a* inner surface
61*b* outer surface
61*c* outer peripheral surface
62 operating portion
63 support hole
63*a* restricting edge part

63*b* cut
64 enlarged diameter portion
65 guiding recess
65*a* inclined surface
66 engaging protrusion
67 guiding groove
67*a* insertion portion
67*b* guiding portion
68 protrusion
68*a* end part
68*b* coupling portion
69 engaging hole
70 shield member
71 side wall portion
72 coupling wall portion
73 cut portion
74 end part
81 first sealing member
82 second sealing member
90 retainer
110 mating connector
140 housing
141 guiding shaft portion

What is claimed is:

1. A lever-type connector, comprising:
a tubular housing including an opening, a part of a mating connector being inserted into the opening; and
a lever to be rotatably supported on the housing,
the housing including a pair of side walls facing each other and a pair of coupling walls coupling the side walls and facing each other,
the pair of side walls and the pair of coupling walls constituting the opening,
the lever including a pair of arm portions configured to respectively cover the pair of side walls from outside and to be supported rotatably with respect to the side walls and an operating portion coupling the arm portions, the lever attaching and detaching the housing to and from the mating connector as being rotated between a first position where the lever is upright with respect to an axis of the housing and a second position where the lever is inclined away from the opening,
the housing and the lever including first restricting portions for restricting rotation of the lever from the first position toward the opening by interfering with each other, and
the first restricting portions including the coupling wall facing the operating portion with the lever located at the first position,
wherein the side wall includes a cut portion for allowing a guiding shaft portion projecting from a housing of the mating connector to escape,
the housing and the lever include second restricting portions for restricting rotation of the lever from the first position toward the second position by being engaged with each other, and
the second restricting portions are constituted by the cut portion and an engaging protrusion provided on the inner surface of the arm portion and to be engaged with the cut portion with the lever located at the first position, and
the side wall includes an escaping recess for allowing the engaging protrusion to escape with the lever located at the second position.

2. The lever-type connector of claim 1, wherein the first restricting portions include a protrusion projecting from at least one of the operating portion and the arm portions.

3. The lever-type connector of claim 1, comprising a plurality of terminals provided inside the housing, wherein:
the plurality of terminals are arranged in a facing direction of the coupling walls.

4. The lever-type connector of claim 1, wherein:
the housing includes a pair of support shafts projecting toward mutually opposite sides from outer surfaces of the pair of side walls,
the arm portions include support holes, the support shafts being inserted into the support holes, and
the support shafts and the support holes have convex and concave parts to allow passage of the support shafts into the support holes with the lever located at the first position and, on the other hand, hinder the passage of the support shafts into the support holes with the lever located at a position other than the first position between the first and second positions.

5. The lever-type connector of claim 1, wherein:
the arm portion includes a guiding groove in an inner surface thereof, the guiding groove being engaged with the guiding shaft portion and guiding a relative movement of the guiding shaft portion when the lever rotates between the first and second positions.

6. The lever-type connector of claim 5, comprising:
a plurality of terminals provided inside the housing; and
a shield member in the form of a metal tube provided inside the housing, the shield member covering outer peripheries of the plurality of terminals,
wherein:
a gap for allowing insertion of a housing of the mating connector is provided between the housing and the shield member, and
the shield member and the cut portion overlap in a facing direction of the side walls.

7. The lever-type connector of claim 1, comprising a sealing member provided inside the housing, the sealing member sealing between the housing and a housing of the mating connector.

8. The lever-type connector of claim 1, wherein the escaping recess is recessed inwardly from an outer surface of the side wall, the recess being open toward the coupling wall that faces the operating portion with the lever at the first position, and being inclined to allow the engaging protrusion to escape when the lever rotates between the first and second positions.

9. A lever-type connector, comprising:
a tubular housing including an opening, a part of a mating connector being inserted into the opening;
a lever to be rotatably supported on the housing;
a plurality of terminals provided inside the housing; and
a shield member in the form of a metal tube provided inside the housing, the shield member covering outer peripheries of the plurality of terminals,
the housing including a pair of side walls facing each other and a pair of coupling walls coupling the side walls and facing each other,
the pair of side walls and the pair of coupling walls constituting the opening,
the lever including a pair of arm portions configured to respectively cover the pair of side walls from outside and to be supported rotatably with respect to the side walls and an operating portion coupling the arm portions, the lever attaching and detaching the housing to and from the mating connector as being rotated between a first position where the lever is upright with respect to an axis of the housing and a second position where the lever is inclined away from the opening, the housing and the lever including restricting portions for restricting rotation of the lever from the first position toward the opening by interfering with each other, and the restricting portions including the coupling wall facing the operating portion with the lever located at the first position, wherein the arm portion includes a guiding groove in an inner surface thereof, the guiding groove being engaged with a guiding shaft portion projecting from a housing of the mating connector and guiding a relative movement of the guiding shaft portion when the lever rotates between the first and second positions, the side wall includes a cut portion for allowing the guiding shaft portion to escape, a gap for allowing insertion of a housing of the mating connector is provided between the housing and the shield member, and the shield member and the cut portion overlap in a facing direction of the side walls.

* * * * *